United States Patent
Link et al.

(10) Patent No.: US 6,877,644 B2
(45) Date of Patent: Apr. 12, 2005

(54) DEVICE FOR DISPENSING FLOWABLE MATERIAL COMPONENTS

(75) Inventors: Otmar Link, Buchen-Görzingen (DE); Franz Altrichter, Krautheim (DE)

(73) Assignee: AZO-Verwaltungs-GmbH, Osterburken (DE)

( * ) Notice: Subject to any disclaimer, the term of this patent is extended or adjusted under 35 U.S.C. 154(b) by 0 days.

(21) Appl. No.: 10/700,584

(22) Filed: Nov. 5, 2003

(65) Prior Publication Data

US 2004/0222241 A1 Nov. 11, 2004

(30) Foreign Application Priority Data

May 9, 2003 (DE) .......................................... 103 20 763

(51) Int. Cl.$^7$ ................................................ G01F 11/20
(52) U.S. Cl. .................... 222/413; 222/410; 222/185.1; 222/504
(58) Field of Search .......................... 222/185.1, 181.1, 222/181.2, 412–413, 410, 333, 236, 504

(56) References Cited

U.S. PATENT DOCUMENTS

| | | | |
|---|---|---|---|
| 3,280,996 A | | 10/1966 | McKinney |
| 5,110,015 A | * | 5/1992 | Kilts .......................... 222/413 |
| 5,423,455 A | * | 6/1995 | Ricciardi et al. .............. 222/1 |
| 5,715,976 A | * | 2/1998 | Kautz .......................... 222/413 |
| 6,420,665 B1 | | 7/2002 | Solignac |
| 6,568,567 B2 | * | 5/2003 | McKenzie et al. ....... 222/181.1 |
| 6,571,990 B2 | * | 6/2003 | Bird .......................... 222/185.1 |

FOREIGN PATENT DOCUMENTS

| | | |
|---|---|---|
| EP | 0 287 708 | 10/1988 |
| EP | 41 19 354 | 12/1992 |

* cited by examiner

Primary Examiner—Frederick C. Nicolas
(74) Attorney, Agent, or Firm—Paul Vincent

(57) ABSTRACT

A device for dosed dispensing of flowable material components comprises supply containers receiving the material components and having an outlet and with at least one removal element having an inlet. Each material component can be removed from the supply container in dosed charges by a screw with controllable drive. The removal element can be docked to the outlet of the supply container, wherein the screw is disposed without drive, but rotatable in the region of the outlet and within the supply container and has an outlet-side coupling element. A controllable drive is disposed in the region of the inlet of the removal element whose drive shaft has a terminal coupling element which can be connected to the coupling element of the screw for secure mutual rotation therewith, and also having a closing piece sealing the outlet of the supply container. The closing piece for the outlet of the supply container is loaded with an axial spring force to hold the closing piece in sealing abutment on the outlet. The coupling element on the drive shaft is provided with an integrated suction gripper for lifting the closing piece from the outlet in opposition to the spring force.

11 Claims, 4 Drawing Sheets

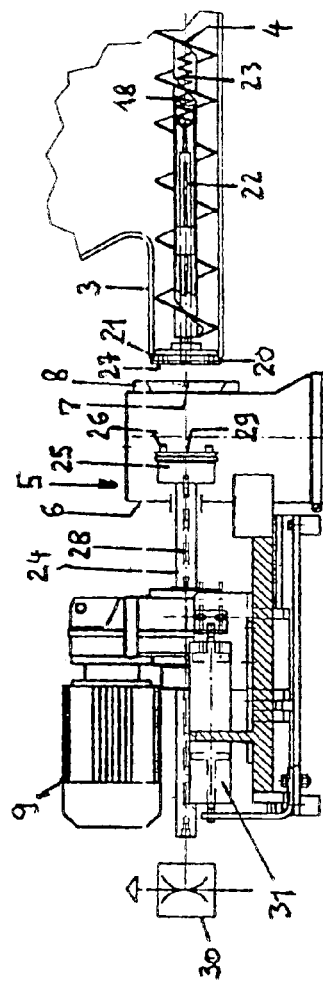
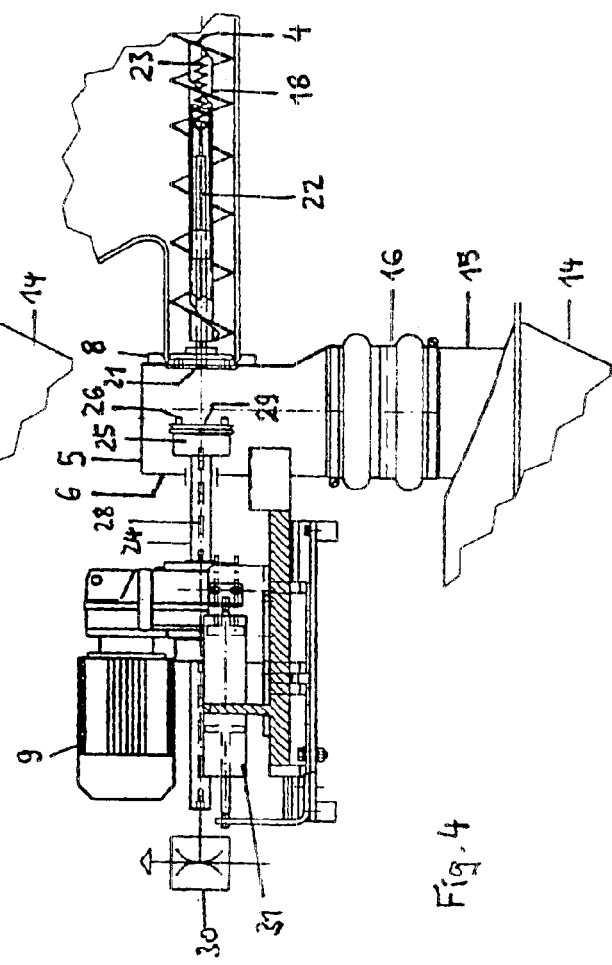
Fig. 3
Fig. 4

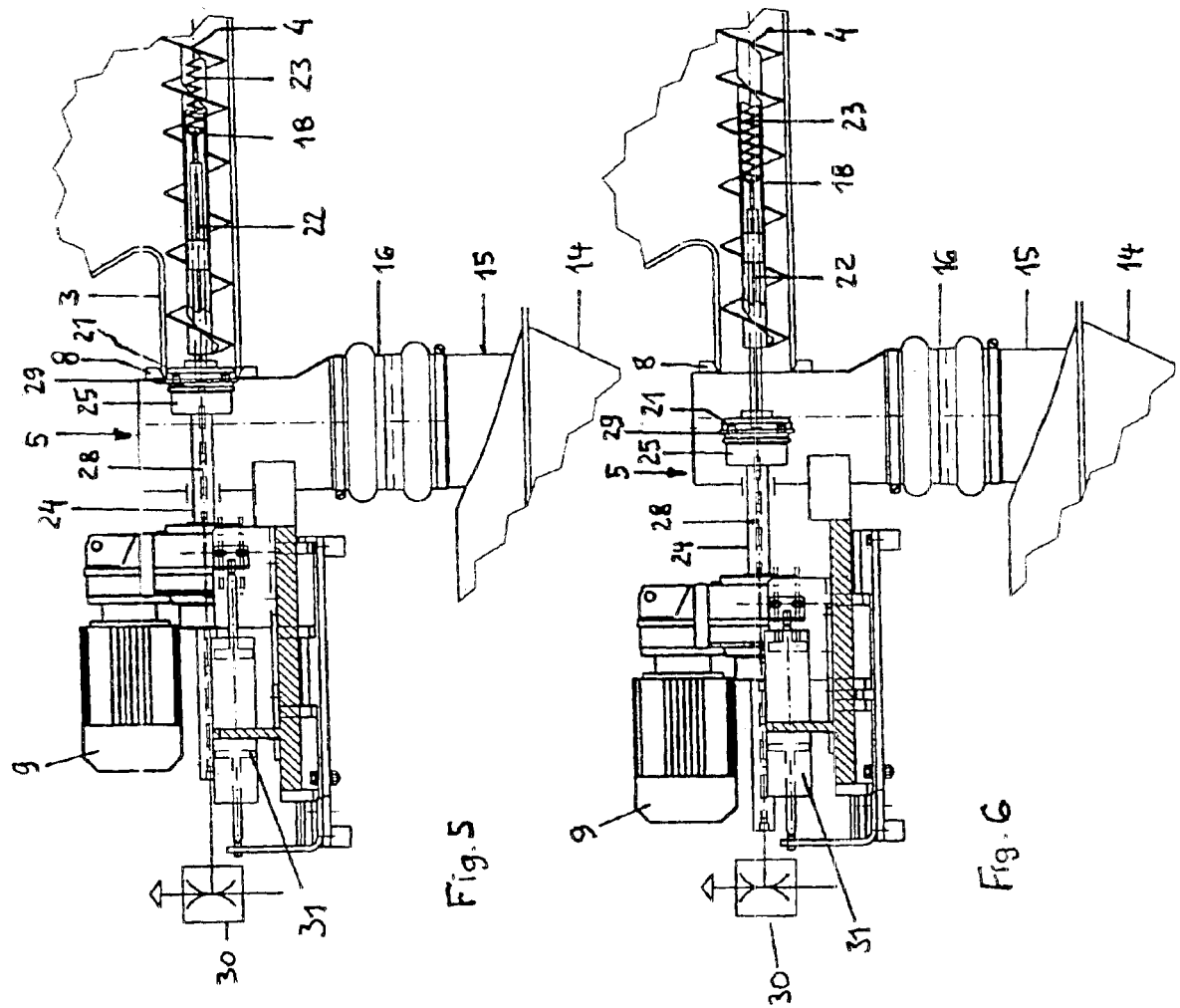

DEVICE FOR DISPENSING FLOWABLE MATERIAL COMPONENTS

This application claims Paris Convention priority of DE 103 20 763.5 filed May 9, 2003 the complete disclosure of which is hereby incorporated by reference.

BACKGROUND OF THE INVENTION

The invention concerns a device for dosed dispensing of flowable material components, with supply containers receiving the material components, and having an outlet and with at least one removal means with an inlet, wherein the material components can be removed in batches from the supply container by means of a screw and a controllable drive, and the removal means and the supply container can be moved relative to each other, wherein the inlet of the removal means can be docked to the outlet of the supply container.

Flowable material components, such as powder or granulated bulk material, which are provided in supply containers, require dosed dispensing of the components for their intended use, in particular, when the dosed material components are to be dispensed, in correspondence with a predetermined recipe, to a mixer, a processing machine e.g. an extruder, an injection molding machine, a tablet-compressing machine, a packing machine, a conveyor or the like.

To detect the mass throughput of the discharged material components, the prior art supply containers have a feed screw on their outlet side (EP 0 344 521). The feed screw is driven by a motor and disposed downstream of the outlet of the supply container which is formed e.g. as a silo, such that a desired quantity of the material component can be removed from the supply container. Dosing is effected volumetrically through the number of revolutions of the feed screw or gravimetrically, wherein the material component is transferred to a weighing container and the feed screw is stopped as soon as the weighing container contains the desired amount of material. These systems are demanding and expensive since each supply container has its own screw drive, and inefficient, in particular for containers having a relatively small volume, e.g. for the allocation of chemicals, colorants, pharmaceutical substances etc.

Moreover, conventional removal means comprising feed screws with controllable drive (DE 199 41 920) receive the material components to be dosed e.g. via a charging funnel. Dosing is also effected volumetrically through the number of revolutions of the screw or gravimetrically by transferring the material component into a weighing container via the screw. Disadvantageously, the material remaining in the feed screw after dosing of a material component must be disposed of and the use of such a removal means for dosed allocation of different material components produces undesired cross-contamination in the feed screw.

These disadvantages are eliminated in accordance with a prior suggestion of the Assignee which was not previously published (DE 102 20 792, EP 03006459) in that the feed screw is disposed in the region of the outlet and within the supply container without drive but rotatable and has a coupling means on the outlet side, wherein the inlet region of the removal means has a controllable drive whose drive shaft has a terminal coupling means which can be connected to the coupling means of the screw for secure mutual rotation therewith, and the screw coupling means also has a closing piece sealing the outlet of the supply container.

This design permits exact dosing of the material component to be removed from the respective supply container by docking the inlet of the removal means to the outlet of the supply container and connecting the coupling means of the removal means drive shaft to the coupling means of the otherwise undriven screw, in the region of the outlet of the supply container. The screw is then set into rotation via the drive shaft by the controlled drive of the removal means thereby transferring the material component from the supply container outlet via the inlet into the removal means. As soon as the desired amount of the material component has been removed from the supply container, the drive shaft is stopped, decoupled from the screw and the removal means is moved away from the outlet of the supply container. The dosed allocation can be conventionally provided volumetrically through control of the number of rotations of the drive shaft connected to the screw or gravimetrically by a weighing container connected downstream of the removal means. Since the screw remains in the outlet of the supply container, the entire removed material can be supplied for its intended use, thereby avoiding cross-contamination. The drive-less arrangement of the screw in the region of the outlet of each supply container permits extremely inexpensive production thereof compared to supply containers having their own downstream motor driven screw such that the supply container can e.g. be constructed as a portable, one-way container. The supply container may of course also be a stationary or displaceable container or a silo with an outlet disposed on the lower side of the container, wherein, in particular, several supply containers are provided and the removal means may be displaceable between the outlets of the supply containers to remove the desired amounts of the various material components provided in these containers. The above-described device is suitable, in particular, for batch-like sequential supply of different material components provided in several supply containers, e.g. plastic granulated matter of different types or colors, additives, colorants, pharmaceutical agents etc. which are to be fed to a mixer or a processing machine according to a predetermined recipe.

In view of this previously unpublished suggestion of the Assignee, it is the underlying purpose of the present invention to guarantee safe transfer of the material components.

SUMMARY OF THE INVENTION

This object is achieved in accordance with the invention in that the closing piece for the outlet of the supply container is subjected to an axial spring force which holds the closing piece in sealing abutment on the outlet and the coupling means is provided on the drive shaft with an integrated suction gripper for lifting the closing piece from the outlet in opposition to the spring force.

The closing piece is held in sealing abutment on the outlet of the container as long as no product is removed from the container. This ensures safe closure when filling and transporting the container and no product can flow out of the outlet after the dosing process.

For dosed removal of the product, the coupling means has an integrated suction gripper on the drive shaft for lifting the closing piece from the outlet in opposition to the spring force. When the coupling means reach an operative position relative to the drive shaft and the screw, the suction gripper also becomes effective and the closing piece is lifted from the outlet in opposition to the spring force, wherein the effective position of the coupling means also provides for the drive of the screw in the container which is rotated until the desired dosing amount has been delivered. Subsequently, the negative pressure on the suction gripper is reduced so that the closing piece returns to its sealing position on the outlet via the axial spring force.

In accordance with an embodiment, the screw has a hollow shaft which contains a tension spring which exercises the spring force acting on the closing piece. The tension spring permanently draws the closing piece into sealing abutment on the outlet, irrespective of the rotary position of the screw and the coupling means connected thereto.

In a further embodiment, the drive comprises a drive shaft with an axial channel which terminates on the coupling means thereby forming the suction gripper, the opposite end being connected to a suction nozzle. As soon as the coupling means engage and the suction gripper is placed under vacuum, the coupling means associated with the dosing screw can be lifted together with the closing piece from the outlet in opposition to the tension spring and the dosing process can be executed when the drive shaft and the carried-along screw of the supply container rotate.

The two coupling means advantageously comprise at least two coupling pins on the sides facing each other and corresponding bores, wherein connection with secure mutual rotation is produced through engagement of the coupling pins in the bores.

The coupling means for the screw and the closing piece are advantageously formed as a one-piece, disk-shaped component whose rear side sealingly abuts the outlet and whose front face has bores for receiving the pins on the drive-side coupling means.

Advantageously, the drive together with the drive shaft and the removal means can be displaced into a docking position in which the inlet of the removal means is connected to the outlet of the supply container. After docking, the drive and drive shaft are displaced to the coupling position of the coupling means, the suction gripper is placed under vacuum and the closing piece is returned to its opening position through retracting the drive and drive shaft. At the same time, the screw coupled to the drive shaft is set into rotation to start the dosing process.

Towards this end, the removal means has a peripheral docking ring at its inlet, which surrounds the outlet of the supply container in the docking position. This docking ring preferably has a conical inner surface.

In a further preferred embodiment, the drive with the drive shaft can be displaced by a pneumatic cylinder between the different operating positions.

Since gravimetric dosing of powders and flowable bulk material is far more important than volumetric dosing, the removal means is connected downstream to container scales for gravimetric detection of the dosed material component. The container scales can preferably be displaced on a transport frame past several supply containers for collecting different material components, wherein the removal means with drive is disposed on the transport frame and a flexible connection for decoupling the scales from the drive and the removal means is provided between the removal means and the container scales. The flexible connection ensures that the motional forces of the drive for the dosing screw and other reaction forces cannot be transferred to the container scales thereby falsifying the weighing results.

The invention is described below with reference to an embodiment shown in the drawing.

BRIEF DESCRIPTION OF THE DRAWING

FIG. 3 is a partial sectional view of the region of the removal means before docking;

FIG. 4 is a view of the removal means of FIG. 3 after docking;

FIG. 5 is a corresponding view of the removal means before starting the dosing process; and FIG. 6 is a corresponding view during the dosing process.

DESCRIPTION OF THE PREFERRED EMBODIMENT

Figure 1:
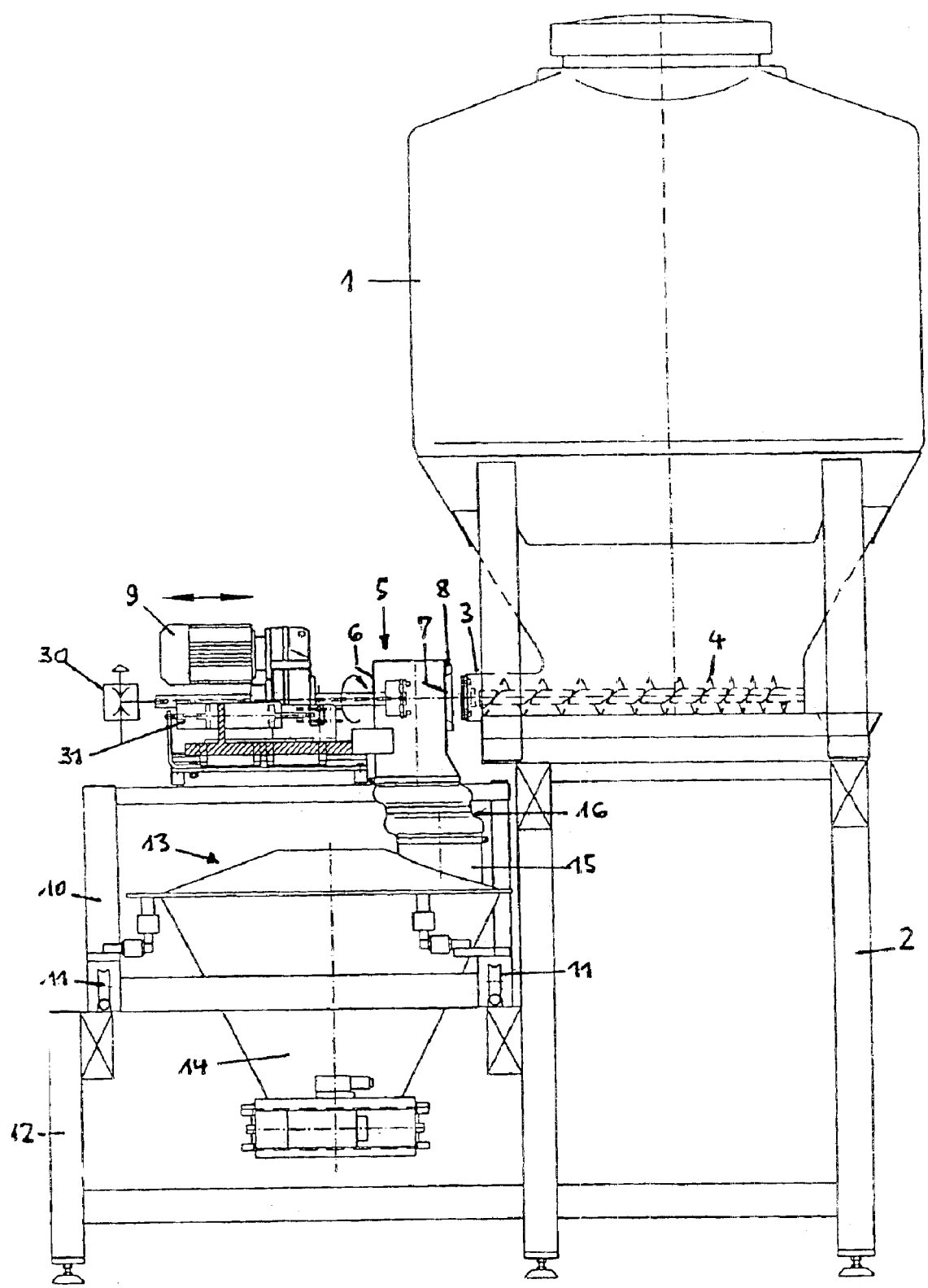
FIG. 1 shows a schematic view of an embodiment of the device for gravimetric dosing of several material components.

FIG. 1 shows only one supply container 1 of several supply containers disposed behind one another in a row which—similar to a shelf storage—are disposed on a rack 2 and, when filled, can be put into the shelf by means of a fork-lift or the like and when empty, be removed from the shelf. Each container 1 has an outlet connecting piece 3, with the outlet connecting pieces of all containers being identical and disposed at the same height. A screw 4, without drive, is disposed in the bottom region of each container 1. A removal means 5 can be displaced along the container row and has a type of drop shaft 6 with an inlet 7 with surrounding docking ring 8 for cooperation with the outlet connecting piece 3 of each supply container 1.

The removal means 5 has an associated drive 9, e.g. an electromotor, which, as described below, serves to drive the feed screw 4 in the supply container 1. The removal means 5 and the drive 9 are disposed on a transport frame 10 which can be displaced by rollers 11 on a base frame 12 connected to the frame 2. In the embodiment shown, container scales 13 are inserted into the transport frame 10 into which the dosed components from the removal means 5 are disposed. A flexible connection 16 is provided between the removal means 5 and the inlet connecting piece 15 of the container 14 to prevent forces from acting on the container 14 of the container scales 13 during the dosing process.

Figure 2:
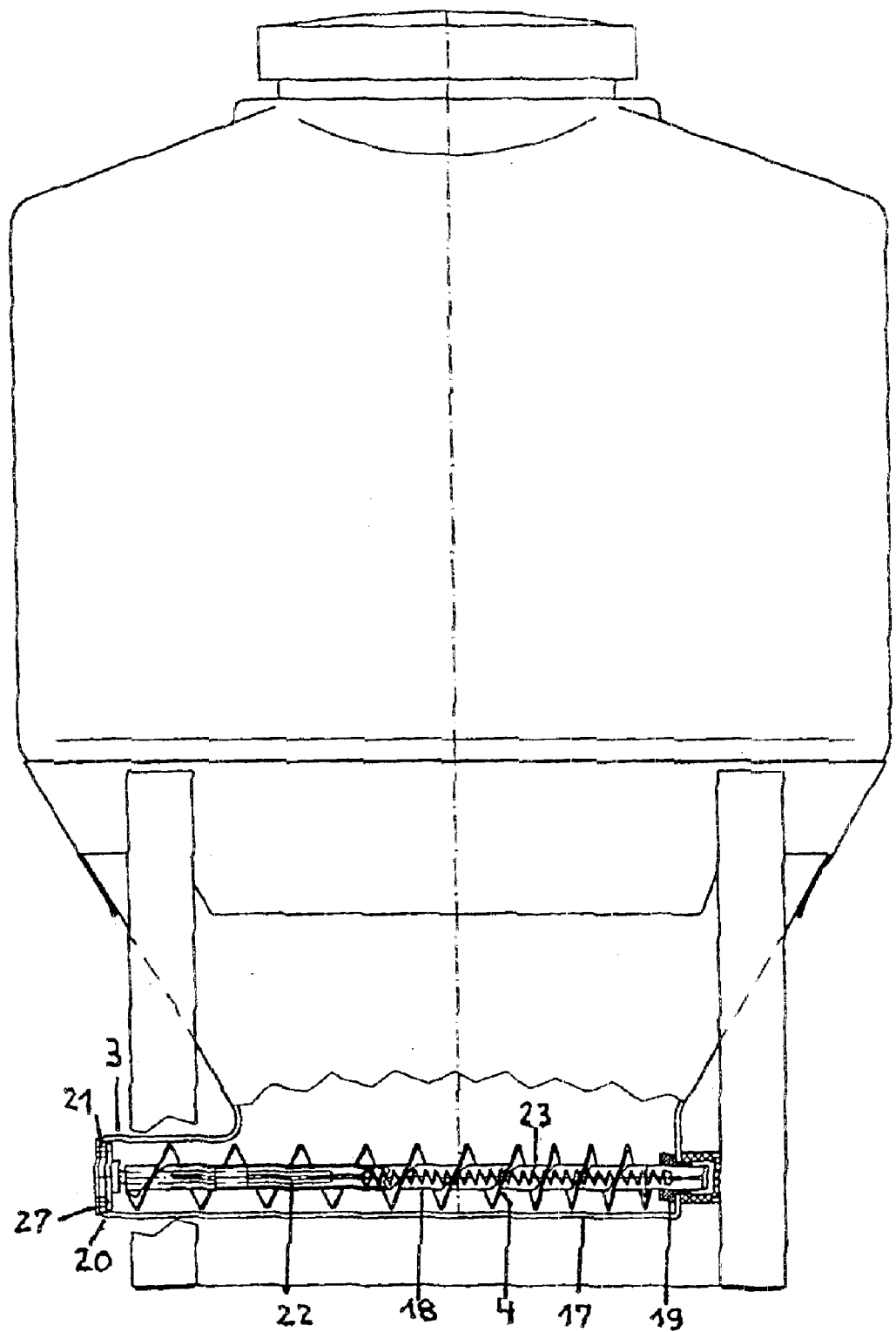
FIG. 2 is an enlarged view of the supply container in accordance with FIG. 1 with a partial section in the region of the container bottom.

FIG. 2 shows the container 1 in an enlarged, partially cut view. The screw 4 disposed in the region of the floor 17 of the container has a hollow shaft 18 which is seated at its one end 19 in a bearing and whose opposite free end is guided in the outlet connecting piece 3 by the screw threads. The screw 4 is disposed in the container without a drive. The outlet connecting piece 3 terminates in an outlet 20 through which the material component present in the container 1 can be discharged. This outlet 20 is closed by a closing piece 21 as long as no material is removed. Towards this end, the connecting piece 21 is located at the external end of a profiled shaft 22 which cooperates with an inner profile of the hollow shaft 18 for transmitting torques. The profiled shaft 22 is moreover connected to a tension spring 23 which is disposed within the hollow shaft 18. The tension spring 23 pulls the closing piece 21 via the profiled shaft 22 in a sealing manner onto the outlet 20 of the outlet connecting piece 3 as long as no product is removed from the supply container. This prevents leakage of the product during transport or filling of the container 1 and subsequent product flow through the outlet 20 after a dosing process.

FIGS. 3 to 6 each show an enlarged section in the region of the transfer of the product. The drive 9 drives a shaft 24 which engages in the drop shaft 6 of the removal means 5 and has a coupling means 25 at that location in the form of two coupling pins 26 which can be brought into a position for cooperation with corresponding bores in a coupling means 27 which also serves as the closing piece 21 (FIG. 2)

to drive the dosing screw 4 via the profiled shaft 22 and the hollow shaft 18. The drive shaft 24 also has a channel 28 which terminates on the face of the coupling means 25 and which is connected on its opposite side to a vacuum nozzle 3, thereby forming a suction gripper 29.

The drive 9 can be displaced together with the drive shaft 24 in several positions, shown in FIGS. 4 through 6. When the removal means 5 with container scales 13 has been displaced into the position in front of the outlet connecting piece 3 of a container (FIG. 3), the removal means 5 and the drop shaft 6 are displaced by the pneumatic cylinder 31 into the docking position of FIG. 4 in which the docking ring 8 engages about the outlet connection piece 3 in the region of the outlet 20. The flexible connection 16 is thereby simultaneously moved into a neutral position in which it prevents vertical and horizontal forces from being transferred to the container 14 of the container scales 13. The drive 9 and drive shaft 24 then displace the coupling means 25 until the coupling pins engage in the bores of the closing piece 21 to produce a drive connection between the drive shaft 24 and the profiled shaft 22 and thereby with the hollow shaft 18. At the same time, the suction gripper 29, which is integrated on the coupling means 25, is activated via the suction nozzle 30 to lift the closing piece 21 from the outlet 20 (FIG. 5) such that, when the drive 9 is returned into the starting position, the outlet 20 is opened. At the same time or shortly before, the drive shaft 24 is rotated such that the screw 4 is set into rotation via the profiled shaft 22 and the hollow shaft 18 and the dosed amount of the product is discharged from the supply container via the drop shaft 6 to the container 14 of the container scales 13 until the desired component weight has been reached. Subsequently, the removal means and coupling means are moved in reverse order (FIG. 5→FIG. 4→FIG. 3) into the displacement position such that the removal means with drive and container scales can address the next container. In the position of FIG. 5, the channel 28 in the drive shaft 24 is vented such that the suction gripper releases and the tension spring 23 holds the closing piece 21 in a sealing manner on the outlet 20 such that no product can flow after the dosing process has been finished.

We claim:

1. A device for dosed dispensing of flowable material components, the device comprising:
   at least one supply container receiving a material component, each supply container having an outlet;
   at least one removal means, each removal means having an inlet, wherein said removal means and said supply container can be moved relative to each other to dock said inlet of said removal means with said outlet of said supply container;
   a screw means disposed for rotation within said supply container in a region of said outlet, said screw means for removing the material component from said supply container in dosed charges, said screw means having an outlet side screw coupling means, said screw coupling means having a closing piece sealing said outlet of said supply container;
   a controllable drive disposed in a region of said inlet of said removal means, said controllable drive having a drive shaft with a drive coupling means structured for connection to said screw coupling means for secure mutual rotation therewith;
   means for exerting an axial spring force on said closing piece to hold said closing piece in sealing abutment on said outlet; and
   a suction gripper integral with said drive coupling means for lifting said closing piece from said outlet in opposition to said spring force.

2. The device of claim 1, wherein said screw means comprises a hollow shaft in which a tension spring is disposed to generate said spring force acting on said closing piece.

3. The device of claim 1, wherein said drive has a drive shaft with an axial channel having a first end extending to said drive coupling means and a second opposite end connected to a suction nozzle to constitute said suction gripper.

4. The device of claim 1, wherein one of said drive and said screw coupling means has at least two coupling pins cooperating with corresponding bores in a facing side of the other one of said drive and said screw coupling means, wherein connection for secure mutual rotation is provided through engagement of said coupling pins into said bores.

5. The device of claim 1, wherein said screw coupling means and said closing piece are formed as a one-piece, disc-shaped component.

6. The device of claim 1, wherein said drive can be displaced together with said drive shaft and said removal means into a docking position in which said inlet of said removal means is connected to said outlet of said supply container.

7. The device of claim 1, wherein after docking of said removal means, said drive can be displaced together with said drive shaft into a coupling position in which said screw and said drive coupling means engage.

8. The device of claim 1, wherein said drive can be displaced with said drive shaft into a removing position in which said drive coupling means and said closing piece are removed from said outlet of said supply container under an action of said suction gripper.

9. The device of claim 1, wherein said removal means has a docking ring surrounding said inlet and surrounding said outlet of said supply container in a docking position.

10. The device of claim 1, wherein said drive can be displaced with said drive shaft by means of a pneumatic cylinder.

11. The device of claim 1, further comprising container scales, a transport frame and a flexible connection, wherein said container scales are connected downstream of said removal means for gravimetric detection of a dosed material component, said container scales being displacable to several supply containers along and on said transport frame, wherein said removal means and said drive are disposed on said transport frame to collect different material components, said flexible connection being provided between said removal means and said container scales for decoupling said scales from said drive and said removal means.

* * * * *